United States Patent
Jones et al.

[11] Patent Number: 5,520,823
[45] Date of Patent: May 28, 1996

[54] FILTERS FOR LIGHT METALS

[75] Inventors: David L. Jones; Martin S. Swift, both of Birmingham, England; Reinhard Stoetzel, Borken, Germany

[73] Assignee: Foseco International Limited, Birmingham, England

[21] Appl. No.: 335,764
[22] PCT Filed: May 10, 1993
[86] PCT No.: PCT/GB93/00956
  § 371 Date: Nov. 14, 1994
  § 102(e) Date: Nov. 14, 1994
[87] PCT Pub. No.: WO93/25296
  PCT Pub. Date: Dec. 23, 1993

[30] Foreign Application Priority Data
  Jun. 5, 1992 [GB] United Kingdom ............ 9211947

[51] Int. Cl.$^6$ ............................... B01D 37/00
[52] U.S. Cl. ............... 210/767; 210/496; 210/510.1
[58] Field of Search ......................... 210/496, 510.1, 210/500.25, 500.26, 767

[56] References Cited

U.S. PATENT DOCUMENTS

| | | |
|---|---|---|
| 2,997,402 | 8/1961 | McDonald et al. . |
| 3,524,548 | 8/1970 | McDonald et al. . |
| 5,114,472 | 5/1992 | Eckert et al. ............... 75/412 |
| 5,169,542 | 12/1992 | Kaettlitz et al. ............ 210/767 |

FOREIGN PATENT DOCUMENTS

| | | |
|---|---|---|
| 0388010 | 9/1990 | European Pat. Off. . |
| 0507463 | 10/1992 | European Pat. Off. . |
| 1428437 | 3/1976 | United Kingdom . |
| 2207913 | 2/1989 | United Kingdom . |

*Primary Examiner*—Frank Spear
*Attorney, Agent, or Firm*—Nixon & Vanderhye

[57] ABSTRACT

Filters for filtering molten light metals comprise a reticular foam formed from a composition comprising graphite, wollastonite, silica and a borosilicate glass and consist of a crystalline phase comprising graphite and wollastonite dispersed in a substantially amorphous matrix of borosilicate glass. The filters can readily be machined accurately from large pieces of the filter material, and they do not pick up moisture from the atmosphere when stored.

20 Claims, No Drawings

FILTERS FOR LIGHT METALS

This invention relates to filters for filtering light metals, by which term is to be understood aluminium, magnesium, alloys of these two metals, and alloys of either or both of these metals with other metals in which alloys, aluminium and/or magnesium predominate. In particular the invention relates to filters of relatively small size for use in dies for the gravity diecasting of aluminium or aluminium alloys.

It is well known to use open-cell ceramic foams to filter molten light metals. Such ceramic foam filters are generally made by impregnating an organic foam, usually polyurethane foam, with an aqueous slurry containing the material which is to form the filter and a binder, removing excess slurry, drying to remove water, and firing the dried impregnated foam to burn off the organic foam to form a ceramic foam.

Using the above method of manufacture individual filters are produced of the required shape and size, or alternatively a large piece of ceramic foam is produced and cut or machined to form individual filters. Both methods of manufacture suffer from disadvantages.

When individual filters of a given nominal size are produced directly from organic foam of a similar size to the filters their dimensional variation is such that problems arise in use, particularly in the gravity die casting of aluminium and its alloys, in which the filter is inserted in a recess in the die. As oversize filters cannot be used because they cannot be inserted in the recess it is common practice to compensate for the dimensional variations by deliberately making the filter slightly too small for the size of the recess. As a result small gaps remain between the edge of the filter and the wall of the recess, and because metal can penetrate through the gaps and bypass the filter, filtration efficiency is reduced. If the filter is loose, crushing of the filter can occur when the die is closed and this can lead to particles of ceramic material from the filter passing through the filter, and into the casting cavity of the die, thus resulting in inclusions in the casting.

When individual filters are produced from large pieces of ceramic foam by cutting or machining, manufacturing costs are high and productivity rates low, due to the nature of the materials from which the filters have hitherto been made. As the materials are brittle fracture of the foam tends to occur when the foam is cut or machined.

U.S. Pat. No. 3,524,548 describes a rigid, porous, filter medium for molten aluminium comprising particles of refractory material and a vitreous bonding agent of the type described in U.S. Pat. No. 2,997,402. The vitreous or glassy bonding agent consists essentially of boron oxide, calcium oxide and aluminium oxide and contains not more than 10% by weight of silica.

British Patent 1428437 describes a filter medium for molten aluminium made by shaping, drying and calcining at a temperature not lower than 1000° C. a mixture comprising aggregate particles of fused alumina, sintered alumina, silicon carbide and/or silicon nitride, a combustible material, a caking material, water and an inorganic bonding material having a chemical composition of 10 to 50% by weight of silica and 5 to 20% by weight of boric oxide, at least 70% by weight of the inorganic bonding material being a non-vitreous substance. The inorganic bonding agent is prepared by mixing and pulverising at least 70% by weight of a natural or synthetic non-vitreous substance and not more than 30% by weight of a vitreous substance such as a commercially available glaze for porcelain.

EP 0507463A describes reticular foam filters which can be machined or cut to size from large pieces of filter material and which have a composition comprising graphite, wollastonite, silica, an alkali phosphate glass and monoaluminium orthophosphate.

It has now been found that the filters described in EP 0507463A can be improved if a borosilicate glass is used instead of the alkali phosphate glass and the monoaluminium orthophosphate.

According to the invention there is provided a filter for the filtration of molten light metals comprising a reticular foam formed from a composition comprising graphite, wollastonite, silica and a glass characterised in that the filter consists of a crystalline phase comprising graphite and wollastonite dispersed in a substantially amorphous matrix of borosilicate glass.

The filters of the invention may be made by impregnating a large piece of reticulated organic foam, such as polyurethane foam, with an aqueous slurry containing the graphite, wollastonite, silica, borosilicate glass, one or more binders which function during manufacture, and optionally other components, removing excess slurry (for example by squeezing the impregnated organic foam), drying and firing the impregnated organic foam, and then cutting or machining the resulting piece of inorganic foam to smaller pieces of the required shape and size. When the impregnated organic foam is fired the maximum firing temperature will usually be of the order of 800° C.

The aqueous slurry used for producing the filters of the invention will usually contain 5–25% by weight graphite, 1–10% by weight of wollastonite, 5–20% by weight silica and 35–50% by weight of borosilicate glass.

The wollastonite may be a powder or in the form of small fibres (for example of length 150 microns).

The silica used to produce the filters should be a very fine particle size silica such as a fumed silica, a colloidal silica, or the fine silica which is produced as by product in the production of silicon metal.

The borosilicate glass used to produce the filters preferably has a softening temperature ($T_1$) in the range of 600° C., more preferably 650° C. to 900° C. and a melting temperature ($T_2$) in the range of 700° C. to 1100° C., as measured according to the tests in German Standard DIN 51730. Suitable borosilicate glasses include those sold by Bayer AG as ES71630, X0800215, X0800216 and X0800286, the chemical composition (% by weight) and $T_1$ and $T_2$ values for which are tabulated below:

|  | ES71630 | X0800215 | X088216 | X0800286 |
|---|---|---|---|---|
| $SiO_2$ | 39.08 | 37.7–42.3 | 32.0–34.2 | 53.66 |
| $B_2O_3$ | 14.50 | 31.0–34.6 | 29.7–31.3 | 20.30 |
| $Na_2O$ | 9.52 | 12.8–6.5 | 15.1–17.5 | 5.63 |
| CaO | 13.12 | 8.7–9.8 | — | 5.72 |
| MgO | 9.63 | 2.0–3.1 | — | 0.42 |
| $Al_2O_3$ | 10.06 | 1.5–2.1 | 14.0–14.9 | 9.85 |
| $K_2O$ | 0.37 |  | 4.4–5.9 | 1.35 |
| $ZrO_2$ | 0.61 |  |  | — |
| $TiO_2$ | 0.20 |  |  |  |
| $Fe_2O_3$ |  |  |  | 0.27 |
| Other oxides | rest |  |  | rest |
| $T_1$ | 712° C. | 641° C. | 621° C. | 790° C. |
| $T_2$ | 950° C. | 750° C. | 780° C. | 970° C. |

In the table the figures quoted for the composition of ES71630 and X0800286 are values determined by chemical analysis of a particular sample, and the figures for the other three borosilicate glasses are ranges quoted in the supplier's literature.

The preferred borosilicate glasses are ES71630 and X0800286.

Alternatively, if desired the borosilicate may be formed in situ during the production of the filter from sodium silicate or calcium-sodium silicate and boric oxide added to the starting composition.

After firing the filters of the invention consist of a crystalline phase comprising principally graphite, wollastonite, and, if the borosilicate glass contains significant quantities of calcium oxide or magnesium oxide, diopside (a calcium-magnesium-silicate having the formula Ca Mg $(SiO_3)_2$), and possibly crystobalite, dispersed in a substantially amorphous matrix of borosilicate glass.

In addition to the graphite the composition which is used to produce the filter of the invention may also contain amorphous carbon, such as carbon black, usually in an amount of up to about 5% by weight. The carbon black has the effect of improving the rheology of the slurry and loading of the strand of the reticular organic foam during impregnation of the foam with the slurry. In order to improve the appearance of the filter and to overcome the tendency of the graphite to produce a mottled appearance when the reticular foam filter material is fired, the composition also preferably contains a minor proportion, usually up to about 5% by weight, of silicon metal. It is believed that the silicon also reduces the tendency for some of the graphite to be lost due to oxidation during firing.

The composition used to produce the filters may also contain a proportion, usually in an amount of up to about 10% by weight, of mica which because of its lamellar structure improves the strand loading of the organic reticular foam when the foam is impregnated with the slurry and also gives improved strength of the fired filter material.

Binders which can be used to produce green strength in impregnated large pieces of foam and a bond during drying and the initial stages of firing include a carbohydrate material such as dextrin, a polyacrylate, a polyvinylmethylether, a copolymer of an acrylic ester and styrol and a lignosulphonate such as an ammonium lignosulphonate. The amount of binder used will usually be up to 5% by weight based on the weight of the slurry. Monoaluminium orthophosphate may be used as a binder provided it has been neutralised to prevent reaction with the borosilicate glass, and provided it is only used in small quantities in order to avoid problems due to the finished filters being hygroscopic.

A material, such as glycerol, may be added to the slurry, usually in an amount of less then 1% by weight based on the weight of the slurry to prevent premature drying out of the slurry when it has been applied to the organic foam.

The slurry used to produce the filters may also contain additives to improve the applicational properties of the slurry during impregnation of the organic foam. Examples of such additives are rheological agents, for example organic thickening agents or titania, wetting agents and antifoaming agents.

When used the amount of rheological agent, wetting agent or antifoaming agent will usually be of the order of 0.1–2.0% by weight based on the weight of the slurry.

When the impregnated organic foam is fired it is desirable that the firing temperature does not exceed 850° C., unless special precautions are taken, otherwise excessive oxidation of the graphite, and amorphous carbon if present, will occur. The firing temperature will usually be in the range of 600° C.–800° C.

In order to alleviate any tendency for the edges to be friable and to improve strength to facilitate handling, in a preferred embodiment of the invention the exterior surfaces of large filters are coated with a composition comprising graphite and a binder and optionally silicon metal. If desired the composition used to coat the exterior surfaces of large bodies of filter material may be the same as or a more dilute version of the slurry which is used to produce the large bodies. After the large filters have been dried they are coated with the composition, for example by spraying the composition on to the dried filter, the filter is then heated to dry the coating, and finally fired. The fired large filter is then machined to produce small filters of a desired size.

If desired dust produced when large bodies of the filter material are cut or machined to produce individual filters may be recycled by adding it to the slurry which is used subsequently to produce other bodies of filter material, or to coat the external surfaces of other large bodies.

The filters of the invention have all the desirable characteristics and properties of the filters described in EP 0507463A and they also have additional advantages compared to those filters.

When the filters described in EP 0507463A are stored in contact with the atmosphere they have a tendency to pick up moisture. The filters of the present invention do not suffer from this disadvantage.

The filters of the present invention also have superior strength, both at ambient and elevated temperatures compared to the filters described in EP 0507463A.

The following Examples will serve to illustrate the invention:

EXAMPLE 1

Reticular foam filters were produced using an aqueous slurry of the following composition by weight:

| | |
|---|---|
| graphite | 12.40% |
| fine silica (byproduct from silicon production) | 10.94% |
| wollastonite fibres (length 150 microns) | 7.29% |
| wollastonite powder | 3.36% |
| borosilicate glass (ES71630) | 32.82% |
| amorphous carbon | 1.82% |
| titania | 0.73% |
| mica | 3.36% |
| silicon | 3.65% |
| dispersant | 0.44% |
| thickening agent | 0.15% |
| glycerol | 0.44% |
| neutralised monoaluminium orthophosphate (60% w/w solution) | 0.88% |
| polyvinylmethylether (50% W/W solution) | 0.88% |
| water | 20.84% |

Pieces of reticulated polyurethane foam measuring 485 mm×640 mm×22 mm and having pores per cm were impregnated with the slurry, and excess slurry was removed by squeezing the foam.

After impregnation the pieces were coated by spinwheel spraying with a diluted version of the same slurry and the impregnated and coated foam was dried at 80° C. for 1 hour and at 120° C. for 30 minutes.

The coating procedure was repeated with the pieces inverted so as to coat what had been the underside in the first coating operation. After drying at 120° C. for 10 minutes the pieces were fired at 800° C. for 30 minutes, and finally cut to produce individual filters of nominal size 50 mm×50 mm×22 mm.

The suitability of the individual filters for filtering molten aluminium was then assessed by an impingement test after the filters had been weighed and measured using test apparatus of the type described and shown in Canadian Patent Application No. 2007450. The filters were inserted in a frame and approximately 25 kg of molten aluminium at a temperature of approximately 800° C. were allowed to fall on to the filters from a ladle through a down pipe 350 cm high. The filters passed the test if they did not disintegrate under the action of the molten aluminium stream.

The results obtained are tabulated below:

| Filter No. | Weight (g) | Dimensions (mm) | Pour Time | Pass/ (s)Fail |
|---|---|---|---|---|
| 1 | 19.6 | 50.3 × 49.4 × 21.8 | 22.7 | Pass |
| 2 | 18.2 | 49.8 × 49.8 × 21.8 | 17.6 | Pass |
| 3 | 13.4 | 49.5 × 49.5 × 21.6 | 18.9 | Pass |
| 4 | 18.3 | 50.4 × 49.5 × 21.8 | 20.1 | Pass |
| 5 | 13.4 | 49.3 × 49.6 × 21.9 | 16.0 | Pass |
| 6 | 18.0 | 49.3 × 49.6 × 22.0 | 19.4 | Pass |

EXAMPLE 2

Reticular foam filters were produced using an aqueous slurry of the following composition by weight:

| | |
|---|---|
| graphite | 18.18% |
| fine silica | 9.73% |
| (by product from silicon production) | |
| wollastonite fibres | 12.45% |
| borosilicate glass (ES71630) | 29.36% |
| amorphous carbon | 1.64% |
| silicon | 1.64% |
| ammonium lignosulphonate (50% w/w solution) | 0.95% |
| thickening agent (RHODOPOL) | 0.14% |
| rheological agent | 9.45% |
| (NORDFLOC AP 30E 1% w/w solution) | |
| acrylic ester/styrol copolymer (ACRONAL 290D) | 2.82% |
| neutralised monoaluminium orthophosphate | 0.73% |
| (60% w/w solution) | |
| water | 12.91% |

Individual filters of nominal size 50 mm×50 mm×22 mm were produced and tested using the procedures described in Example 1 except that in the impingement tests the temperature of the molten aluminium was approximately 850° C.

The results obtained are tabulated below:

| Filter No. | Weigth (g) | Dimensions (mm) | Pour Time (s) | Pass/ Fail |
|---|---|---|---|---|
| 7 | 19.3 | 49.6 × 49.7 × 20.4 | 21.8 | P |
| 8 | 19.7 | 49.6 × 48.8 × 20.6 | 21.6 | P |
| 9 | 19.0 | 49.7 × 49.2 × 20.4 | 20.0 | P |

Chemical analysis of the filters by X-Ray Fluorescence and X-Ray Diffraction showed that the filters were composed of principally graphite, wollastonite and diopside dispersed in a borosilicate glass matrix.

EXAMPLE 3

Reticular foam filters were produced using an aqueous slurry of the following composition by weight:

| | |
|---|---|
| graphite | 17.63% |
| fine silica | 9.43% |
| (by product from silicon production) | |
| wollastonite fibres | 12.07% |
| bottle glass | 26.67% |
| boric acid | 1.45% |
| amorphous carbon | 1.59% |
| silicon | 1.59% |
| ammonium lignosulphonate (50% w/w solution) | 0.92% |
| thickening agent (RHODOPOL) | 0.14% |
| rheological agent (NORDFLOC NF 10E) | 0.05% |
| acrylic ester/styrol copolymer (ACRONAL 290D) | 2.73% |
| dextrin | 1.75% |
| water | 23.98% |

The bottle glass contained, by weight, 70.31% silica, 11.84% sodium oxide, 11.73% calcium oxide, 3.45% alumina and 1.52% magnesium oxide.

Individual filters of nominal size 50 mm×50 mm×22 mm were produced and tested using the procedures described in Example 1 except that in the impingement tests the temperature of the molten aluminium was 850° C.

The results obtained are tabulated below:

| Filter No. | Weight (g) | Dimensions (mm) | Pour Time (s) | Pass/ Fail |
|---|---|---|---|---|
| 10 | 15.2 | 50.2 × 50.2 × 21.9 | 13.2 | P |
| 11 | 15.5 | 50.1 × 50.5 × 21.9 | 14.2 | P |
| 12 | 16.3 | 50.4 × 50.2 × 22.0 | 11.8 | P |
| 13 | 15.6 | 50.5 × 50.3 × 22.4 | 12.8 | P |

Chemical analysis of the filters by X-Ray Fluoresence and X-Ray Diffraction showed the filters were composed of principally graphite, wollastonite, diopside and cristobalite dispersed in a borosilicate glass matrix.

A borosilicate glass made from the bottle glass and boric acid in the proportions used in the above composition had a softening temperature ($T_1$) of 790° C. and a melting temperature ($T_2$) of 1050° C. as measured according to the tests in German Standard DIN51730.

We claim:

1. A filter for the filtration of light molten metals, comprising:

a reticular foam formed from a composition comprising graphite, wollastonite, silica, and a glass;

said filter having a crystalline phase comprising graphite and wollastonite dispersed in a substantially amorphous matrix of borosilicate glass.

2. A filter as recited in claim 1 wherein the borosilicate glass used to produce the filter has a softening temperature ($T_1$) in the range 600° C. to 900° C. and a melting temperature ($T_2$) in the range of 700° C. to 1100° C. as measured according to the tests in German Standard DIN51730.

3. A filter as recited in claim 2 wherein the borosilicate glass has a softening temperature ($T_1$) in the range 650° C. to 900° C.

4. A filter as recited in claim 3 wherein the borosilicate glass is formed in situ during the production of the filter from sodium silicate or calcium-sodium silicate and boron oxide.

5. A filter as recited in claim 4 wherein the crystalline phase contains diopside and/or crystobalite.

6. A filter as recited in claim 5 wherein the composition from which the filter is formed also contains amorphous carbon.

7. A filter as recited in claim 6 wherein the composition from which the filter is formed also contains silicon.

8. A filter as recited in claim 7 wherein the composition from which the filter is formed also contains mica.

9. A filter as recited in claim 8 wherein the filter is formed from an aqueous slurry containing 5–25% by weight graphite, 1–10% by weight wollastonite, 5–20% by weight silica and 35–50% by weight of borosilicate glass.

10. A filter as recited in claim 1 wherein the filter is formed from an aqueous slurry containing 5–25% by weight graphite, 1–10% by weight wollastonite, 5–20% by weight silica and 35–50% by weight of borosilicate glass.

11. A filter as recited in claim 1 wherein the borosilicate glass is formed in situ during the production of the filter from sodium silicate or calcium-sodium silicate and boron oxide.

12. A filter as recited in claim 1 wherein the crystalline phase contains diopside and/or crystobalite.

13. A filter as recited in claim 1 wherein the composition from which the filter is formed also contains amorphous carbon.

14. A filter as recited in claim 13 wherein the composition from which the filter is formed also contains silicon.

15. A filter as recited in claim 14 wherein the composition from which the filter is formed also contains mica.

16. A filter as recited in claim 13 wherein the composition from which the filter is formed also contains mica.

17. A filter as recited in claim 1 wherein the composition from which the filter is formed also contains mica.

18. A filter as recited in claim 1 wherein the composition from which the filter is formed also contains silicon.

19. A method of filtering light molten metals, comprising the steps of:

(a) impregnating a reticulated foam with a slurry comprising graphite and wollastonite dispersed in a substantially amorphous matrix of borosilicate glass;

(b) removing excess slurry from the foam;

(c) drying the slurry impregnated foam;

(d) firing the slurry impregnated foam;

(e) producing individual filters from the fired foam; and (f) passing light molten metal through the individual filters to remove contaminants therefrom.

20. A method as recited in claim 19 wherein step (a) is practiced by impregnating the foam with an aqueous slurry containing about 5–25% by weight graphite, about 1–10% by weight wollastonite, about 5–20% by weight silica, and about 35–50% by weight borosilicate glass, and also including one or more of amorphous carbon, silicon, and mica.

* * * * *